(12) United States Patent
Huang

(10) Patent No.: US 12,266,134 B2
(45) Date of Patent: Apr. 1, 2025

(54) DATA PROCESSING METHOD AND ELECTRONIC DEVICE

(71) Applicant: GUANGDONG OPPO MOBILE TELECOMMUNICATIONS CORP., LTD., Guangdong (CN)

(72) Inventor: Fenghua Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 505 days.

(21) Appl. No.: 17/723,319

(22) Filed: Apr. 18, 2022

(65) Prior Publication Data

US 2022/0245859 A1 Aug. 4, 2022

Related U.S. Application Data

(63) Continuation of application No. PCT/CN2020/128443, filed on Nov. 12, 2020.

(30) Foreign Application Priority Data

Nov. 27, 2019 (CN) .......................... 201911184981.9

(51) Int. Cl.
*G06T 7/73* (2017.01)
*A63F 13/213* (2014.01)
(Continued)

(52) U.S. Cl.
CPC .............. *G06T 7/74* (2017.01); *A63F 13/213* (2014.09); *G06F 3/1454* (2013.01); *G06T 11/00* (2013.01);
(Continued)

(58) Field of Classification Search
None
See application file for complete search history.

(56) References Cited

U.S. PATENT DOCUMENTS 9,047,698 B2 * 6/2015 Maciocci ............. H04N 9/3173
2016/0018657 A1 1/2016 Hong et al.
2018/0165888 A1 6/2018 Duan et al.

FOREIGN PATENT DOCUMENTS

CN 108520552 9/2018
CN 108734736 11/2018
(Continued)

OTHER PUBLICATIONS

CNIPA, First Office Action for CN Application No. 201911184981.9, Jan. 27, 2021.
(Continued)

*Primary Examiner* — Yanna Wu
(74) *Attorney, Agent, or Firm* — Hodgson Russ LLP

(57) ABSTRACT

A data processing method and an electronic device are provided. The data processing method is implemented by a first device. In the method, an image including a first target object is acquired, the first target object being located in a first reality scene where the first device is located. Based on the image, a map corresponding to the first reality scene is built, and data of the map is obtained. The data of the map is transmitted to a second device, the data of the map being used to instruct the second device to perform relocation based on the data of the map and a second target object, the first and second target objects having at least two identical feature points, the second target object being in a second reality scene where the second device is located, and the second reality scene being different from the first reality scene.

20 Claims, 10 Drawing Sheets

(51) Int. Cl.
*G06F 3/14* (2006.01)
*G06T 11/00* (2006.01)
*G06V 40/20* (2022.01)
*G06F 3/01* (2006.01)

(52) U.S. Cl.
CPC .............. *G06V 40/20* (2022.01); *G06F 3/017* (2013.01); *G06T 2207/30244* (2013.01); *G06T 2210/61* (2013.01); *G06V 2201/07* (2022.01)

(56) References Cited

FOREIGN PATENT DOCUMENTS

| CN | 109035415 | 12/2018 |
|---|---|---|
| CN | 109087359 | 12/2018 |
| CN | 109949422 | 6/2019 |
| CN | 110286768 | 9/2019 |
| CN | 110457414 | 11/2019 |

OTHER PUBLICATIONS

CNIPA, Notification to Grant Patent Right for Invention for CN Application No. 201911184981.9, Jul. 29, 2021.
WIPO, International Search Report for PCT/CN2020/128443, Feb. 19, 2021.
Minatani et al., "Face-to-Face Tabletop Remote Collaboration in Mixed Reality," 6th IEEE and ACM International Symposium on Mixed and Augmented Reality, 2007.
Allusse et al., "Accelerating Template-Based Matching on the GPU for AR Applications," 6th IEEE and ACM International Symposium on Mixed and Augmented Reality, 2007.
EPO, Extended European Search Report for EP Application No. 20891862.3, Apr. 11, 2023.

* cited by examiner

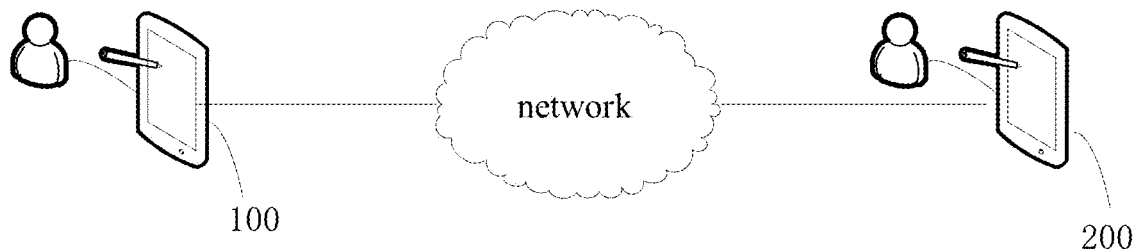

FIG. 1

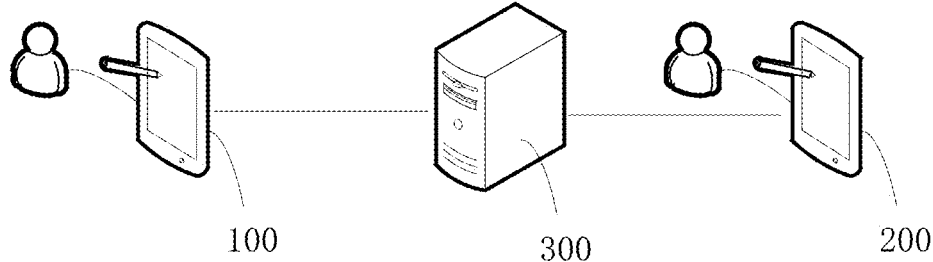

FIG. 2

| acquiring an image including a first target object, the first target object is located in a first real scene where the first device is located | S110 |

| building, based on the image, a map corresponding to the first real scene, and obtaining data of the map | S120 |

| transmitting the data of the map to a second device, the data of the map is configured to instruct the second device to perform relocalization based on the data of the map and a second target object, the first target object and the second target object have at least two identical feature points, the second target object is located in a second real scene where the second device is located, and the second real scene is different from the first real scene | S130 |

FIG. 3 acquiring data of a map transmitted from a first device, the data of the map is obtained through the first device by building, based on an acquired image including a first target object, the map corresponding to a first real scene where the first device is located, and the first target object is located in the first real scene — S310 acquiring an image including a second target object, the second target object is located in a second real scene where the second device is located, the first target object and the second target object have at least two identical feature points, and the second real scene is different from the first real scene — S320 performing relocalization based on the data of the map and the image including the second target object — S330

FIG. 7 acquiring data of a map transmitted from a first device, the data of the map is obtained through the first device by building, based on an acquired image including a first target object, the map corresponding to a first real scene where the first device is located, and the first target object is located in the first real scene — S410 acquiring an image including a second target object, the second target object is located in a second real scene where the second device is located, the first target object and the second target object have at least two identical feature points, and the second real scene is different from the first real scene — S420 determining, based on the image including the second target object and the data of the map, first posture data of the second device in a first spatial coordinate system, the first spatial coordinate system is a spatial coordinate system corresponding to the first device — S430 obtaining second posture data of the second device in a second spatial coordinate system, the second spatial coordinate system is a spatial coordinate system corresponding to the second device — S440 obtaining, based on the first posture data and the second posture data, a coordinate system conversion relationship between the first spatial coordinate system and the second spatial coordinate system — S450 acquiring display data and third posture data of a virtual object displayed by the first device — S460 converting, according to the coordinate system conversion relationship, the third posture data into fourth posture data in the second spatial coordinate system — S470 superimposing, based on the display data and the fourth posture data, the virtual object in the second real scene. — S480

FIG. 8

DATA PROCESSING METHOD AND ELECTRONIC DEVICE

CROSS-REFERENCE TO RELATED APPLICATION

The present disclosure is a continuation of International Application PCT/CN2020/128443, filed Nov. 12, 2020, which claims priority to Chinese Patent Application No. 201911184981.9, filed Nov. 27, 2019, the entire disclosures of which are incorporated herein by reference.

TECHNICAL FIELD

The present disclosure relates to display technologies. More particularly, the present disclosure relates to a data processing method and an electronic device.

BACKGROUND

With the progress of science and technology, Augmented Reality (AR) and other technologies have gradually become focus of research at home and abroad. AR is a technology that increases users' perception of real world through information provided by computer systems. It has been widely used in education, games, medical treatment and other fields. Subsequently, a solution of multi-person (also referred to as multi-player) AR also began to appear. In the solution of the multi-person AR of the related art, respective virtual objects are displayed in each other's virtual scene by relocalization, but usually devices need to be in a same scene to complete the relocalization, which makes the relocalization more difficult.

SUMMARY

In view of the above problems, the present disclosure provides a data processing method and an electronic device.

In a first aspect, a data processing method is provided. The data processing method is implemented by a first device, the data processing method includes: acquiring an image including a first target object, the first target object being located in a first real scene where the first device is located; building, based on the image, a map corresponding to the first real scene, and obtaining data of the map; and transmitting the data of the map to a second device, the data of the map being configured to instruct the second device to perform relocalization based on the data of the map and a second target object, the first target object and the second target object having at least two identical feature points, the second target object being located in a second real scene where the second device is located, and the second real scene being different from the first real scene.

In a second aspect, a data processing method is provided. The data processing method is implemented by a second device, the data processing method includes: acquiring data of a map transmitted from a first device, the data of the map being obtained through the first device by building, based on an acquired image including a first target object, the map corresponding to a first real scene where the first device is located, and the first target object being located in the first real scene; acquiring an image including a second target object, the second target object being located in a second real scene where the second device is located, the first target object and the second target object having at least two identical feature points, and the second real scene being different from the first real scene; and performing relocalization based on the data of the map and the image including the second target object.

In a third aspect, an electronic device is provided. The electronic device includes one or more processors, a memory, and one or more application programs. The one or more application programs are stored in the memory and configured to be executable by the one or more processors, and the one or more application programs are configured to execute the data processing method provided by the first aspect or the data processing method provided by the second aspect.

BRIEF DESCRIPTION OF THE DRAWINGS

In order to explain the technical solutions in embodiments of the present disclosure more clearly, the drawings needed in the description of the embodiments will be briefly introduced below. It is obvious that the drawings in the following description are only some embodiments of the present disclosure. For those of ordinary skill in the art, other drawings can be obtained according to these drawings without paying creative work.

FIG. 1 illustrates a schematic view of an application scene applicable to an embodiment of the present disclosure.

FIG. 2 illustrates another schematic view of an application scene applicable to an embodiment of the present disclosure.

FIG. 3 illustrates a schematic flowchart of a data processing method in accordance with an embodiment of the present disclosure.

FIG. 7 illustrates a schematic flowchart of a data processing method in accordance with still another embodiment of the present disclosure.

FIG. 8 illustrates a schematic flowchart of a data processing method in accordance with still another embodiment of the present disclosure.

DETAILED DESCRIPTION OF EMBODIMENTS

Figure 4:
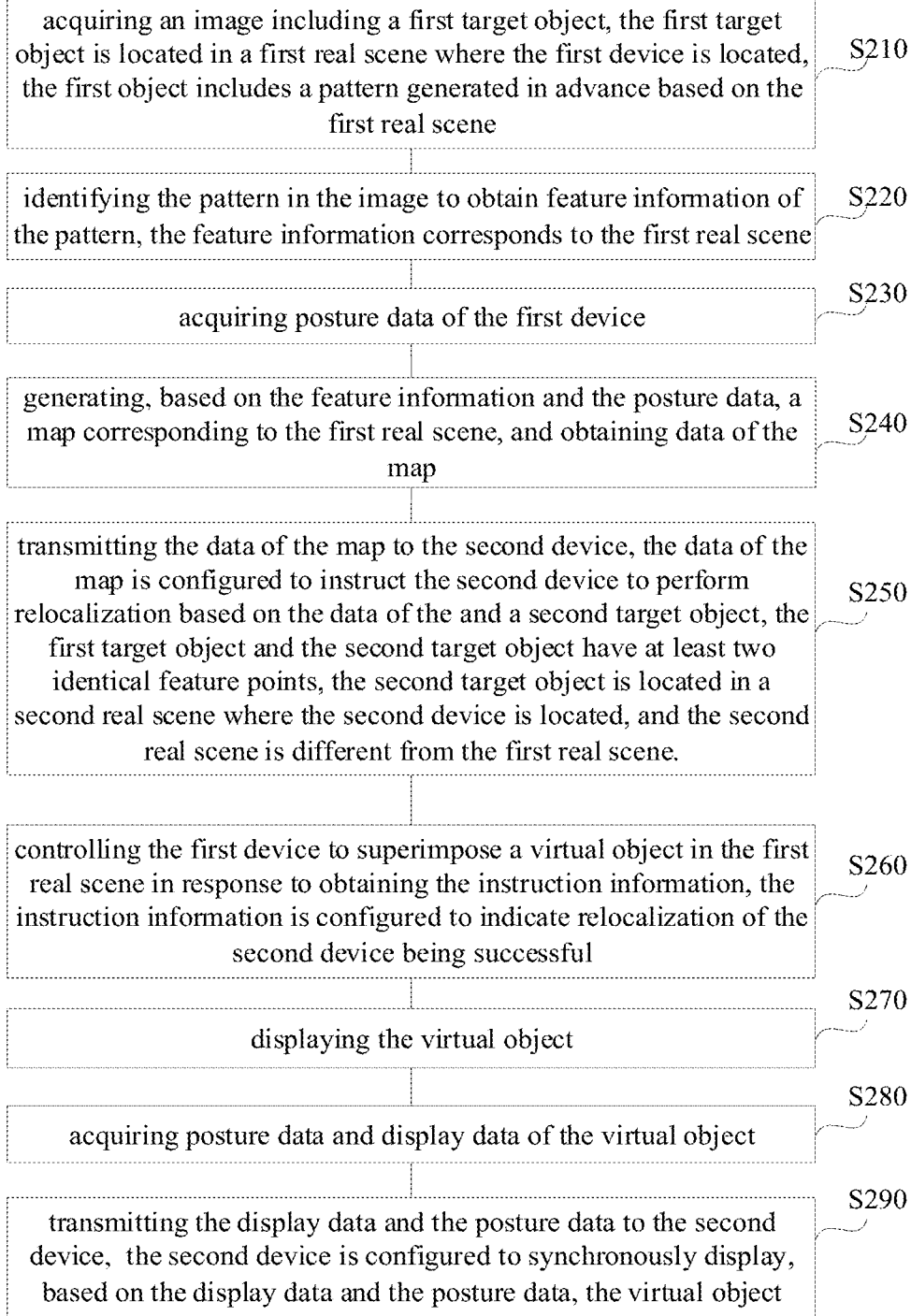
FIG. 4 illustrates a schematic flowchart of a data processing method in accordance with another embodiment of the present disclosure.

In order to enable those of ordinary skill in the art to better understand technical solutions of the present disclosure, the technical solutions in embodiments of the present disclosure will be clearly and completely described below in combination with accompanying drawings in the embodiments of the present disclosure.

It should be noted that the terms "first" and "second" in the description and claims of the present disclosure and the above drawings are used to distinguish similar objects, and do not have to be used to describe a specific order or sequence. It should be understood that the terms so used are interchangeable under appropriate circumstances so that the embodiments of the present disclosure described herein can be implemented in an order other than those illustrated or described herein. In addition, the terms "including" and "having" and any variations thereof are intended to cover non-exclusive inclusions, for example, processes, methods, systems, products or devices that contain a series of steps or units need not be limited to those clearly listed those steps or units, but may include other steps or units not explicitly listed or inherent to these processes, methods, products or equipment.

AR is a technology that increases users' perception of real world through information provided by computer systems. AR superimposes computer-generated contents such as virtual objects, scenes or system prompt information into a real scene to enhance or modify perception of real-world environment or data representing the real-world environment.

In a technical solution of multi-person AR of the related art, it is generally divided into a master device and a slave device. The master device and slave device add and display their own virtual objects based on a synchronous localization and mapping (slam) technology, and then use relocalization to display their own virtual objects in each other's virtual scene, and can operate their own virtual objects for interaction. For example, two game models compete. The relocalization is mainly to make the master device and the slave device understand each other's position, that is, make them share a common coordinate system, and the common coordinate system can be a world coordinate system or a coordinate system of the master device.

After a long time of research, inventor found that in the technical solution of the multi-person AR of the related art, although the virtual objects between various devices can be synchronized to each other's scene through the relocalization, it generally requires two devices to perform relocalization at a same place and at a similar angle to complete the relocalization, this will make it difficult for users to complete the relocalization without experience or guidance, resulting in poor user experience.

In view of the above problems, inventor proposes a data processing method, a data processing apparatus, electronic device and storage medium provided by the embodiments of the present disclosure, which can realize the relocalization based on objects with corresponding relationships in different real scenes, facilitate implementation of the solution of the multi-person AR and improve the user experience. The specific data processing method will be described in detail in the subsequent embodiments.

An application scene of the data processing method provided by an embodiment of the present disclosure is introduced below.

Referring to FIG. 1, FIG. 1 illustrates a schematic view of an application scene of the data processing method in accordance with an embodiment of the present disclosure. The application scene may include a data processing system 10. The data processing system 10 may be used in a scene of the multi-person AR. The data processing system 10 may include a plurality of electronic devices, for example, a first device 100 and a second device 200 are exemplarily shown in FIG. 1.

In at least one illustrated embodiment, the electronic device can be a head mounted display device, a mobile phone, a tablet personal computer and other mobile device. When the electronic device is the head mounted display device, the head mounted display device can be an integrated head mounted display device. The electronic device can also be an intelligent terminal such as a mobile phone connected with an external/access head mounted display device, that is, the electronic device can be used as a processing and storage device of the head mounted display device, the electronic device is inserted or accessed the external head mounted display device, and virtual contents can be displayed in the head mounted display device. The electronic device can also be a separate mobile terminal such as a mobile phone. The mobile terminal can generate a virtual scene and display it on a screen.

In at least one illustrated embodiment, different electronic devices can be in different real scenes, and the electronic devices can communicate with each other. A real scene where each electronic device is located can be set with at least one target object, which can be used to build a map or perform relocalization by the electronic device. The target objects in the real scenes where different electronic devices are located can be the same or bound to each other. For example, a real scene where the first device 100 in FIG. 1 is located can be set with a first target object, the first device 100 can scan the first target object and build a map, after building the map, data of the map can be transmitted to the second device 200, and the second device 200 can perform relocalization based on a second target object in a real scene where the second device 200 is located. Subsequently, the first device 100 and the second device 200 can synchronize virtual contents based on a result of the relocalization.

Referring to FIG. 2, FIG. 2 illustrates another schematic view of an application scene of the data processing method in accordance with an embodiment of the present disclosure. The application scene may include a data processing system 10, which can be used in a scene of multi-person AR. The data processing system 10 may include a plurality of electronic devices and at least one server, and the plurality of electronic devices can communicate with the at least one server. For example, a first device 100, a second device 200 and a server 300 are exemplarily shown in FIG. 2. The server 300 may be a server of the related art, a cloud server, or the like.

In at least one illustrated embodiment, data transmission between the electronic devices can be carried out through the server, that is, the electronic device can transmit data to the server, and then the server will transmit the data to the other electronic devices. For example, the first device 100 can build a map based on a scanned first target object, and send data of the map to the server 300. The server 300 can transmit the data of the map to the second device 200, the second device 200 can perform relocalization according to a second target object in a real scene where the second device 200 is located. Subsequently, the first device 100 and the second device 200 can synchronize virtual contents according to a result of the relocalization.

In the following, a data processing method will be specifically introduced in an embodiment in combination with the attached drawings.

Please refer to FIG. 3, FIG. 3 illustrates a schematic flowchart of a data processing method in accordance with an embodiment of the present disclosure. The data processing method is implemented by the first device in the data processing system, and the data processing system further includes the second device. The flow shown in FIG. 3 will be described in detail below. The data processing method may begin from block S110 to block S130.

At the block S110, acquiring an image including a first target object, the first target object is located in a first real scene where the first device is located.

In the embodiment of the present disclosure, the first target object can be set in the real scene where the first device is located, and the first target object can be a solid object with certain texture features. The first device is configured to scan the first target object to build a map.

In at least one illustrated embodiment, the first target object may include a pattern with a setting texture, so that the first device can identify the pattern in the image, so as to identify feature points in the pattern, and then build a map based on the feature points. A specific shape and size of the first target object cannot be limited. For example, an outline of the target object can be rectangular and a size can be 1 square meter. Of course, the shape and size of the target object can also be other shapes and sizes.

In at least one illustrated embodiment, the first device may include an image acquiring device. The image acquiring device is configured to acquire an image of a real scene, etc. The image acquiring device can be an infrared camera or a visible camera. A specific type of the image acquiring device is not limited in the embodiment of the present application. The first device can perform image acquiring to the first target object through the image acquiring device, and thereby acquire the image including the first target object.

In at least another illustrated embodiment, an image acquiring device can also be connected with the first device, so that the first device can perform image acquisition to the first target object through the external image acquiring device, and thereby obtain the image including the first target object. In this way, the image acquiring device can also be consistent with a position and a posture of the first device, so that the first device can identify the position and the posture based on the image acquired by the external image acquiring device.

At the block S120, building, based on the image, a map corresponding to the first real scene, and obtaining data of the map.

In the embodiment of the present disclosure, after obtaining the image including the first target object, the first device can build the map based on the image including the first target object. The first device can further obtain posture data when the first device acquires the image, and can build the map based on the posture data of the first device and the image including the first target object.

In at least one illustrated embodiment, the first device can identify feature points in the image including the first target object. Information of the feature points of the first target object can be stored in the first device in advance, and these feature points are associated with (correspond to) contents of the map. The first device can identify the feature points of the first target object based on the information of the feature points stored in advance, so as to identify each of the feature points of the first target object. After identifying and obtaining each of the feature points of the first target object, the first device can determine map contents based on each of the feature points. Then, the first device determines a position of each of the map contents in a spatial coordinate system corresponding to the first device based on the posture data of the first device, and builds the map based on each map content and its position. The built map can be used as the map corresponding to the first real scene where the first device is located. It can be understood that the built map can also obtain content data of the map, a position of each content, posture data of the device, information of each feature point of the first target object, etc. These data can be carried in the map. Of course, specific data in the map cannot be limited.

At the block S130, transmitting the data of the map to a second device, the data of the map is configured to instruct the second device to perform relocalization based on the data of the map and a second target object, the first target object and the second target object have at least two identical feature points, the second target object is located in a second real scene where the second device is located, and the second real scene is different from the first real scene.

In the embodiment of the present disclosure, after the first device builds, based on the image including the first target object, the map, and obtains the data of the map, the first device can transmit the data of the map to the second device. After obtaining the data of the map, the second device can perform relocalization based on the data of the map and the second target object in the second real scene where the second device is located, so as to obtain a positional relationship between the first device and the second device, and realize an alignment of a spatial coordinate system corresponding to the first device and a spatial coordinate system corresponding to the second device. Thus, the first device and the second device can display and interact, based on the aligned spatial coordinate systems, virtual contents.

The first target object and the second target object have the at least two identical feature points. For example, the first target object can be the same as the second target object, that is, all feature points are the same. The first device can identify the feature points obtained from the first target object and build the map based on the feature points. The second device can identify the map through the feature points identified from the second target object. Moreover, the map contents built by the first device is the same as that identified by the second device, so that the second device can perform relocalization based on the map identified by the second target object and the map built by the first device. For another example, the first target object and the second target object have partially the same feature points, and a number of partially the same feature points is at least two. Map contents corresponding to other different feature points of the first target object can correspond to map contents corresponding to other different feature points of the second target object. Therefore, the map contents built by the first device based on the first target object and the map contents identified by the second device based on the second target object have some same map contents, while other different map contents correspond to each other. The second device can also realize relocalization based on the same map contents and the corresponding map contents. The relocalization on the second device will be introduced in subsequent embodiments.

The data processing method provided by the embodiment of the present disclosure, by obtaining the image including the first target object, the first target object is located in the first real scene where the first device is located, building, based on the image, the map corresponding to the first real scene, and obtaining the data of the map, and then transmitting the data of the map to the second device, the data of the map is configured to instruct the second device to perform relocalization based on the data of the map and the second target object, and the first target object and the second target object have at least two same feature points, the second target object is located in the second real scene where the second device is located, and the first real scene is different from the second real scene, therefore the relocalization is realized based on the target objects in different real scenes, the implementation of the solution of the multi-person AR is facilitated and the user experience is improved.

Please refer to FIG. 4, FIG. 4 illustrates a schematic flowchart of a data processing method in accordance with another embodiment of the present disclosure. The data processing method is implemented by the first device in the data processing system, and the data processing system further includes the second device. The flow shown in FIG. 4 will be described in detail below. The data processing method may begin from block S210 to block S290.

At the block S210, acquiring an image including a first target object, the first target object is located in a first real scene where the first device is located, the first target object may include a pattern generated in advance based on the first real scene.

In the embodiment of the present disclosure, the first target object may include a generated pattern, which may be generated in advance based on the first real scene, that is, feature points in the pattern correspond to the first real scene. Specifically, the pattern can be a pattern with texture features, and a plurality of feature points in the pattern can correspond to an entity content in the first real scene, subsequently, the first device can build, based on the image including the first target object, the map corresponding to the first real scene.

In at least one illustrated embodiment, the above pattern can be set in the first real scene in a form of stickers, for example, by printing the generated pattern and pasting the printed pattern on the first real scene. In at least another illustrated embodiment, the above pattern can also be set on a solid object (such as a wood board, etc.) in a form of stickers, and the solid object pasted with the generated pattern can be placed in the first real scene. Of course, a specific form of the first target object may not be limited.

In at least one illustrated embodiment, when acquiring the image including the first target object, the first device can acquire the image containing only the first target object to improve the probability of successful map building. It can be understood that since only map contents corresponding to feature information in the above pattern is established in advance, if other feature points are identified, the map content cannot be corresponding to other feature points, which may lead to the interruption of the process of building the map, or there are non-map areas in the built map.

In at least one illustrated embodiment, the first device can also obtain a plurality of images including the first target objects, and the plurality of images including the first target objects can be images obtained by performing image acquisition to the first target object at multiple shooting angles. The multiple shooting angles may be a plurality of shooting angles in the process of 360-degree rotation along a center of the first target object.

In addition, when acquiring the image including the first target object, it can also detect brightness of an ambient light in the first real scene. If the brightness of the ambient light is lower than a preset brightness, it can also be supplemented to improve the efficiency and quality of building the map.

At the block S220: identifying the pattern in the image to obtain feature information of the pattern, the feature information corresponds to the first real scene.

In the embodiment of the present disclosure, after the first device obtains the image including the first target object, the first device can identify the pattern in the image, so as to obtain the feature information of the pattern. The pattern is generated in advance based on the first real scene. The first device identifies the pattern in the image, and the feature information of the obtained pattern can correspond to the first real scene. Specifically, the feature information of the pattern can include a plurality of feature points of the pattern, and the plurality of feature points of the pattern can correspond to an entity content of the first real scene, subsequently the first device can build, based on the image including the first target object, the map corresponding to the first real scene.

At the block S230: acquiring posture data of the first device.

In the embodiment of the present disclosure, since the built map is to be configured to perform relocalization by the second device, the built map should carry the posture data of the first device. In an illustrated embodiment, the first device can calculate, based on the image including the first target object and data (motion data) collected by an inertial measurement unit (IMU), the posture data of the first device. The posture data is configured to characterize position and posture of the first device in a spatial coordinate system corresponding to the first device. For example, the position can be represented by spatial coordinates, and the posture can be represented by rotation angles. Of course, the specific method of acquiring the posture data by the first terminal cannot be limited. For example, the first device can also obtain the posture data by using a positioning module related to the position and the posture.

At the block S240: generating, based on the feature information and the posture data, a map corresponding to the first real scene, and obtaining data of the map.

In the embodiment of the present disclosure, the first device can generate, based on the feature information and the posture data, the map corresponding to the first real scene after identifying and obtaining the feature information of the pattern of the first target object and obtaining the posture data of the first device.

In at least one illustrated embodiment, the first device can determine contents of the map corresponding to the first real scene based on the feature information, and then determine, based on the posture data of the first device, the position of each of the contents of the map in the spatial coordinate system corresponding to the first device, build the map based on each of the contents of the map and its position, and obtain the data of the map. The data of the map can carry the feature information in the above pattern, the posture data of the first device, the content data of the map, the position of each of the contents of the map, etc., and the specific carried data cannot be limited. The spatial coordinate system corresponding to the first device can be a world coordinate system with the first device as an origin, or a camera coordinate system of the first device, which is not limited here.

In at least one illustrated embodiment, the first device can build a plurality of maps in the above way, and select a map satisfying a specified condition from the plurality of maps as the map to be transmitted to the second device. The specified condition can be that a matching degree between a content of the selected map and the first real scene is higher than a setting threshold, the setting threshold can be 90%, 95%, etc. a specific value of the setting threshold cannot be limited. It can be understood that the higher the matching degree between the content of the map and the first real scene, the better the quality of the built map. Through the above methods, the maps with poor quality can be screened out to avoid the subsequent data of the map transmitted to the second device, resulting in relocalization failure.

At the block S250: transmitting the data of the map to a server, the server is configured to transmit the data of the map to the second device, the data of the map is configured to instruct the second device to perform relocalization based on the data of the and a second target object, and the first target object and the second target object have at least two identical feature points. The second target object is located in a second real scene where the second device is located, and the second real scene is different from the first real scene.

In the embodiment of the present disclosure, the block S250 can refer to the content of the above embodiments, which will not be repeated here.

At the block S260: controlling the first device to superimpose a virtual object in the first real scene in response to obtaining the instruction information. The instruction information is configured to indicate the relocalization on the second device being successful.

In the embodiment of the present disclosure, the first device can detect received information. When the instruction information indicating the successful relocalization on the second device being detected, it means that the first device and the second device can display and operate the virtual object, and can synchronize the displayed virtual object. Therefore, the first device can generate and display the virtual object.

In at least one illustrated embodiment, when the instruction information indicating the successful relocalization on the second device being obtained, the first device can further generate a virtual prompt content and display the prompt content. The prompt content can be configured to prompt a user corresponding to the first device, and virtual objects can be added or displayed, so that the user can know that the multi-person AR is currently available.

In at least one illustrated embodiment, the first device can detect operations of the user. When an add operation for adding a virtual object is detected, the first device superimposes the virtual object in the first real scene based on the add operation. Among them, the add operation can be a touch operation of the user on a display screen, which can be triggered by the setting sliding gesture, sliding track, etc. The add operation can also include performing gesture recognition based on a captured gesture image, it is determined that the add operation is detected when the recognized gesture is a setting gesture. A specific form of the add operation can be unlimited. The first device superimposes the virtual object in the first real scene, which can be to superimpose the virtual object on a position of the first real scene based on a transformation relationship between the virtual space and the real space, map it into the virtual space, and generate the virtual object, so as to realize the superposition of the virtual object in the first real scene.

In at least another illustrated embodiment, the first device can also superimpose a preset virtual object in the first real scene in response to obtaining the instruction information indicating the relocalization on the second device being successful. For example, in a game scene, after the relocalization on the second device is completed, the first device can superimpose a preset virtual game character corresponding to the first device in the first real scene. In at least one illustrated embodiment, the first device can be a mobile terminal, such as a mobile phone, a tablet personal computer, etc., and the virtual object can be displayed on a display screen of the mobile terminal. In this embodiment, the first device can obtain a scene image of the first real scene. For example, the scene image is acquired through an image acquiring device on the first device. The first device can also obtain a superposition position where a virtual object is to be superimposed on the first real scene, and then the first device can determine pixel coordinates of the virtual object based on the superposition position, finally, the virtual object is composed with the scene image based on the pixel coordinates to obtain a composite image.

The first device determines the pixel coordinates of the virtual object based on the superposition position. It can be that after the first device aligns the spatial coordinate system in the real space with the spatial coordinate system in the virtual space, that is, after knowing the conversion relationship between the two spatial coordinate systems, it determines the pixel coordinates of the virtual object composed into the scene image based on the superposition position. When composing the virtual object with the scene image, the first device can compose the virtual object into the scene image based on the pixel coordinates to obtain the composite image. The virtual object is composed with the solid object in the scene image, and the subsequent displayed image can enable the user to observe the display effect of AR.

In at least another illustrated embodiment, the first device can be a head mounted display device or a mobile terminal connected with an external head mounted display device, that is, the virtual object is displayed through the head mounted display device. In this embodiment, the first device can obtain a superposition position where the virtual object is to be superimposed in the first real scene and content data of the virtual object, generate the virtual object, and realize the superposition of the virtual object in the first real scene. The first device can convert the superposition position into a spatial position in the virtual space based on the superposition position and the conversion relationship between the spatial coordinate system in the real space and the spatial coordinate system in the virtual space, so as to obtain the spatial position where the virtual object is to be displayed in the virtual space. Then the virtual object is rendered based on the spatial position and the content data of the virtual object, so as to complete the generation of the virtual object.

In the above two embodiments, the superposition position where the virtual object is to be superimposed on the first real scene can be determined based on the detected add operation (also referred to as in response to detecting the add operation). For example, the first device is a mobile terminal. When the virtual object needs to be displayed on the display screen of the mobile terminal, the mobile terminal can display the scene image on the display screen so that the user can determine the superposition position based on the scene image, and then determine the superposition position of the virtual object based on the touch operation of the user on the screen. For another example, when the first device is the head mounted display device, the gesture action of the user in the first real scene can be detected, and the superposition position of the virtual object can be determined based on the position of the gesture action. Of course, the method of specifically determining the superposition position of the virtual object to be superimposed on the first real scene may not be limited. For example, the superposition position may also be preset.

At the block S270: displaying the virtual object.

In the embodiment of the present disclosure, the first device can display the virtual object after superimposing the virtual object in the first real scene, so that the user can see the effect of superimposing the virtual object on the real world, that is, to realize the display effect of AR.

In at least one illustrated embodiment, when the first device is a mobile terminal and the virtual object needs to be displayed on the display screen of the mobile terminal. The first device can display the composite image obtained by composing the virtual object with the scene image on the display screen, so as to realize the display effect of AR.

Figure 5:
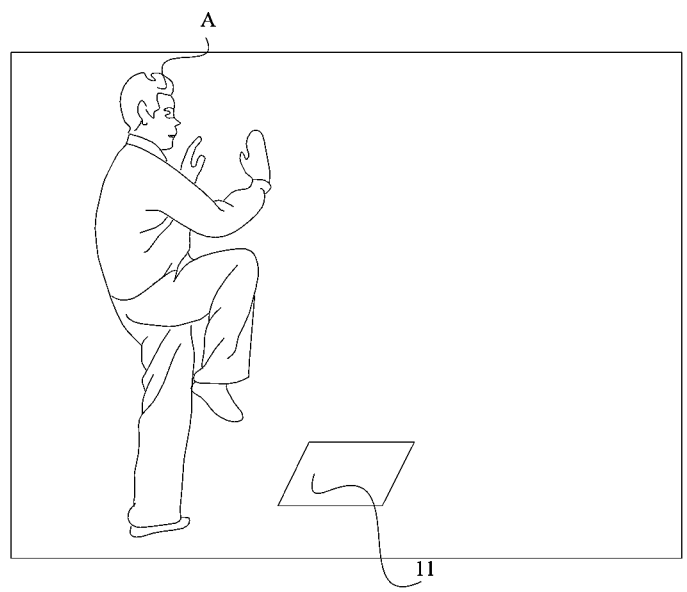
FIG. 5 illustrates a schematic view of a display effect in accordance with an embodiment of the present disclosure.

In at least another illustrated embodiment, when the first device is a head mounted display device and the virtual object is displayed through the head mounted display device. After rendering the virtual object, screen display data of the virtual object can be obtained. The screen display data can include RGB value of each pixel in a display screen and the pixel coordinate corresponding to each pixel. The first device can generate a virtual screen based on the screen display data and project the generated virtual screen onto a display lens through a projection module to display the virtual object, the user can see that the virtual screen is superimposed and displayed at the corresponding position in the first real scene through the display lens, so as to realize the display effect of AR. For example, please refer to FIG. 5, in the scene of the fighting game of the above example, after adding a virtual game character A, the user can observe the virtual game character A in the first real scene through the display lens, and can also observe the first target object 11 in the current field of view in the first real scene, so as to achieve the display effect of AR.

At the block S280: acquiring posture data and display data of the virtual object.

In the embodiment of the present disclosure, after the first device generates and displays the virtual object, the second device is required to display the virtual object synchronously. Therefore, the first device can also determine the posture data and the display data of the virtual object based on the generated virtual object. The posture data can be a position and a posture of the virtual object in the virtual space, and the display data can be content data for rendering the virtual object, such as vertex coordinates, color, etc.

At the block S290: transmitting the display data and the posture data to the second device, and the second device is configured to synchronously display, based on the display data and the posture data, the virtual object.

In the embodiment of the present disclosure, after the first device obtains the display data and the posture data of the generated virtual object, the first device can transmit the display data and the posture data to the second device. The second device can determine a position of the virtual object in its corresponding spatial coordinate system based on the posture data transmitted from the first device, render the virtual object based on the display data, display the virtual object, and synchronize the virtual object generated and displayed by the first device to the second device for display.

Figure 6:
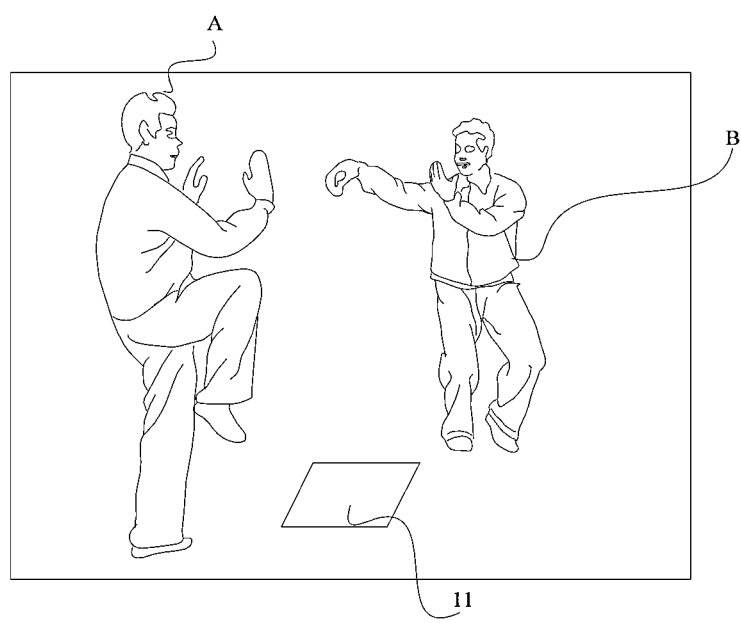
FIG. 6 illustrates a schematic view of another display effect in accordance with an embodiment of the present disclosure.

In at least one illustrated embodiment, the first device can also receive display data and posture data of a target virtual object transmitted from the second device. The target virtual object is a virtual object generated and displayed by the second device after the relocalization. The posture data of the target virtual object can be obtained by converting from the spatial coordinate system aligned with the second device to the spatial coordinate system corresponding to the first device, so that the first device can directly determine display position of the target virtual object based on the posture data of the target virtual object, generate the target virtual object, display the target virtual object, and display the virtual object generated by the first device and the virtual object generated by the second device synchronously. For example, please refer to FIG. 5 and FIG. 6 at the same time. In the scene of the fighting game of the above example, after displaying the virtual game character A, the first device receives display data and posture data of a virtual game character B generated and displayed by the second device and generates and displays the virtual game character B. Therefore, the synchronization of the virtual game character B added by the second device to the first device for display is realized, and action interactions such as fighting between the virtual game character A and the virtual game character B can be controlled to realize the interaction of fighting games.

In at least one illustrated embodiment, the first device can also detect operation data of the added virtual object, respond to the operation data, and synchronize the response result to the second device. For example, after moving the added virtual object, the new posture data can be synchronized to the second device.

The data processing method provided by the embodiment of the present disclosure, by obtaining the image including the first target object, the first target object is located in the first real scene where the first device is located, and the first target object includes the pattern generated in advance based on the first real scene, obtaining the posture data of the first device by identifying the feature information in the image, building the map based on the feature information and the posture data, obtaining the data of the map, and then transmitting the data of the map to the second device. The data of the map is configured to instruct the second device to perform relocalization based on the data of the map and the second target object, and the first target object and the second target object have at least two same feature points, and the second target object is located in the second real scene where the second device is located, the first real scene is different from the second real scene. Thus, the relocalization can be realized based on the objects with corresponding relationships in different real scenes, which facilitates the implementation of the solution of the multi-person AR and improves the user experience. In addition, when the instruction information indicating the successful relocalization on the second device being obtained, the virtual object is generated and displayed, and then the posture data and the display data of the virtual object are transmitted to the second device, so that the second device can display the virtual object synchronously, and the synchronous display in the multi-person AR is realized.

Please refer to FIG. 7, FIG. 7 illustrates a schematic flowchart of a data processing method in accordance with still another embodiment of the present disclosure. The data processing method is implemented by the second device in the data processing system, and the data processing system further includes the first device. The flow shown in FIG. 7 will be described in detail below. The data processing method may begin from block S310 to block S330.

At the block S310: acquiring data of a map transmitted from a first device, the data of the map is obtained through the first device by building, based on an acquired image including a first target object, the map corresponding to a first real scene where the first device is located, and the first target object is located in the first real scene.

In at least one illustrated embodiment, when data are transmitted between the first device and the second device through the server, the data of the map transmitted from the first device can be transmitted to the server, and then the second device receives the data of the map transmitted from the server. Therefore, when the first device is far away from the second device, a remote interaction solution in multi-person AR can be realized.

At the block S320: acquiring an image including a second target object. The second target object is located in a second real scene where the second device is located, the first target object and the second target object have at least two identical feature points, and the second real scene is different from the first real scene.

In the embodiment of the present disclosure, after receiving the data of the map, the second device can obtain the image including the second target object in the second real scene when performing relocalization, so as to perform subsequent relocalization based on the data of the map and the image including the second target object.

In at least one illustrated embodiment, the first target object and the second target object have the at least two identical feature points. For example, the first target object can be the same as the second target object, that is, all feature points are the same. The first device can identify the feature points obtained by the first target object and build the map based on the feature points. The second device can identify the map through the feature points identified by the second target object. Moreover, map contents built by the first device is the same as that identified by the second device, so that the second device can perform relocalization based on the map identified by the second target object and the map built by the first device. For another example, the first target object and the second target object have partially the same feature points, and a number of partially the same feature points is at least two. Map contents corresponding to other different feature points of the first target object can correspond to map contents corresponding to other different feature points of the second target object. Therefore, the map contents built by the first device based on the first target object and the map contents identified by the second device based on the second target object have some same map contents, while other different map contents correspond to each other. The second device can also realize relocalization based on the same map contents and the corresponding map contents. The relocalization on the second device will be introduced in subsequent embodiments.

In at least one illustrated embodiment, the first target object and the second target object can be both stickers, and the pattern on the sticker is generated in advance based on the first real scene where the first device is located, so as to facilitate relocalization by using the data of the map.

In at least one illustrated embodiment, when acquiring the image including the second target object, the second device can also acquire the image containing only the second target object to improve the success probability of the relocalization. In addition, when acquiring the image including the second target object, the second device can also detect brightness of an ambient light in the second real scene. If the brightness of the ambient light is lower than a preset brightness, it can also use a fill light module (such as fill light, etc.) to fill the light, so as to improve the efficiency and quality of building the map.

At the block S330: performing relocalization based on the data of the map and the image including the second target object.

In the embodiment of the present disclosure, after acquiring the data of the map and the image including the second target object, the second device can perform relocalization based on the data of the map and the image including the second target object.

In at least one illustrated embodiment, the second device may identify feature information in the second target object, such as feature information in a pattern of a sticker. The second device can also determine, based on the data of the map, the feature information in the first target object, and match the first target object with the second target object based on the feature information of the first target object and the feature information of the second target object. If a similarity between the first target object and the second target object is greater than a setting similarity, then based on the data of the map and the image including the second target object, a positional relationship between the first device and the second device is determined, and a spatial coordinate system corresponding to the first device with a spatial coordinate system corresponding to the second device is aligned, so as to complete the relocalization. The subsequent first device and the second device can display and interact, based on the aligned spatial coordinate system, virtual contents.

In at least one illustrated embodiment, the second device can identify, based on the image including the second target object, feature information, determine map contents corresponding to the feature information, then obtain posture data of the second device, and then determine, based on the posture data of the second device, a position of each map content in the spatial coordinate system corresponding to the second device, and determine the currently identified map based on each map content and the position corresponding to each map content. Since the first target object and the second target object are the same, or their corresponding map contents are corresponding to each other, the second device can match the two maps based on the map constructed by the first device and the map identified by the second target object and analyze the positional relationship between the first device and the second device. The conversion relationship between the spatial coordinate system corresponding to the first device and the spatial coordinate system corresponding to the second device can be determined based on the positional relationship so as to realize the alignment of the coordinate system and complete the relocalization. After the relocalization, the first device and the second device can synchronize virtual contents based on the aligned spatial coordinate system. The spatial coordinate system corresponding to the first device can be the world coordinate system with the first device as the origin or the camera coordinate system of the first device, which is not limited here. Similarly, the spatial coordinate system corresponding to the second device can be the world coordinate system with the second device as the origin or the camera coordinate system of the second device, which is not limited here.

In the data processing method provided by the embodiment of the present disclosure, the second device obtains the transmitted data of the map, and the data of the map is obtained through the first device by building, based on the acquired image including the first target object, the map corresponding to the first real scene where the first device is located. The first target object is located in the first real scene, and then the second device obtains the image including the second target object. The second target object is located in the second real scene where the second device is located. The first target object has a corresponding relationship with the second target object, and then the second device performs relocalization based on the data of the map and the image including the second target object, so that the relocalization can be realized based on the target objects in different real scenes, which facilitates the realization of the solution of the multi-person AR and improves the user experience.

Please refer to FIG. 8, FIG. 8 illustrates a schematic flowchart of a data processing method in accordance with still another embodiment of the present disclosure. The data processing method is implemented by the second device in the data processing system, and the data processing system further includes the first device. The flow shown in FIG. 8 will be described in detail below. The data processing method may begin from block S410 to block S480.

At the block S410: acquiring data of a map transmitted from a first device. The data of the map is obtained through the first device by building, based on an acquired image including a first target object, the map corresponding to a first real scene where the first device is located, and the first target object is located in the first real scene.

At the block S420: acquiring an image including a second target object. The second target object is located in a second real scene where the second device is located, the first target object and the second target object have at least two identical feature points, and the second real scene is different from the first real scene.

In the embodiment of the present disclosure, the blocks S410 and S420 can refer to the content of the above embodiment, which will not be repeated here.

At the block S430: determining, based on the image including the second target object and the data of the map, first posture data of the second device in a first spatial coordinate system. The first spatial coordinate system is a spatial coordinate system corresponding to the first device.

In at least one illustrated embodiment, the second device can determine each map content corresponding to the feature information in the image and posture data of the second device based on the image including the second target object. The second device can determine a position of each map content in a spatial coordinate system corresponding to the second device, and determine the currently identified map based on each map content and its corresponding position. The second device can perform feature matching based on the identified map and the received map, respectively extract same image features to output a point matching set, and then estimate the posture data of the second device relative to the first spatial coordinate system corresponding to the first device. The pose estimation algorithm can be PNP algorithm, and the specific pose estimation algorithm can be unlimited. The spatial coordinate system corresponding to the first device can be the world coordinate system with the first device as the origin or the camera coordinate system of the first device, which is not limited here.

In at least one illustrated embodiment, when the feature points of the first target object are all the same as those of the second target object, the identified map can be directly matched with the received map, so as to determine the posture data of the second device in the first spatial coordinate system based on the matching result.

In at least another illustrated embodiment, when a part of the feature points of the first target object are the same as a part of the feature points of the second target object, and map contents corresponding to different feature points between the first target object and the second target object are corresponding. Then, in the identified map contents, a part of the map contents can be matched with the received map contents, while the rest of the map contents can be matched with the map contents corresponding to the different feature points of the first target object, so as to determine the posture data of the second device in the first spatial coordinate system based on the matching results.

At the block S440: obtaining second posture data of the second device in a second spatial coordinate system. The second spatial coordinate system is a spatial coordinate system corresponding to the second device.

The second device can determine the second posture data of the second device in the second spatial coordinate system based on the acquired image including the second target object and the data collected by IMU. The spatial coordinate system corresponding to the second device can be the world coordinate system with the second device as the origin or the camera coordinate system of the second device, which is not limited here.

At the block S450: obtaining a coordinate system conversion relationship between the first spatial coordinate system and the second spatial coordinate system based on the first posture data and the second posture data.

In at least one illustrated embodiment, the second device can obtain the coordinate system transformation data between the first spatial coordinate system and the second spatial coordinate system based on the first posture data and the second posture data, such as obtaining a coordinate system transformation matrix, and take the coordinate system transformation data as the coordinate system transformation relationship between the first spatial coordinate system and the second spatial coordinate system. Subsequently, the coordinate system transformation data can be used to realize the transformation of the posture data of the virtual object generated by the first device, so as to synchronously display the virtual object generated and displayed by the first device.

In the embodiment of the present disclosure, after the second device completes the relocalization, it can also generate instruction information and transmit the instruction information to the first device. The instruction information is configured to indicate the relocalization on the second device being successful, so that the user of the first device can know that a virtual object can be added, or the first device can generate a preset virtual object.

At the block S460: acquiring display data and third posture data of a virtual object displayed by the first device.

It can be understood that after the first device transmits the display data and the third posture data of the virtual object it generates and displays, the second device can correspondingly receive the display data and the third posture data.

At the block S470, converting, based on the coordinate system conversion relationship, the third posture data into fourth posture data in the second spatial coordinate system.

In at least one illustrated embodiment, the second device can convert the third posture data into the fourth posture data in the second spatial coordinate system based on the coordinate system conversion relationship obtained above, which realizes the conversion of the posture data of the virtual object from the first spatial coordinate system corresponding to the first device to the second spatial coordinate system corresponding to the second device.

At the block S480: superimposing, based on the display data and the fourth posture data, the virtual object in the second real scene.

In at least one illustrated embodiment, the second device can determine, based on the converted fourth posture data, a position of the virtual object in the second spatial coordinate system, and generate, based on the position and the display data, the virtual object to superimpose the virtual object into the second real scene. For the specific method of superimposing the virtual object on the second real scene, please refer to the method of superimposing the virtual object on the first real scene by the first device in the previous embodiments, which will not be repeated here.

In at least one illustrated embodiment, after the relocalization, the second device can also generate and display a target virtual object based on an add operation of the user or according to preset rules. For example, referring to FIG. 9, after adding the virtual character B, the user corresponding to the second device can observe the virtual character B in the second real scene through the display lens, and can also observe the second target object 12 in the current field of view in the second real scene, so as to realize the display effect of AR. In addition, if the second device has received the virtual object and display data generated by the first device after generating and displaying the target virtual object, the virtual object generated and displayed by the first device can be displayed synchronously.

Figure 9:
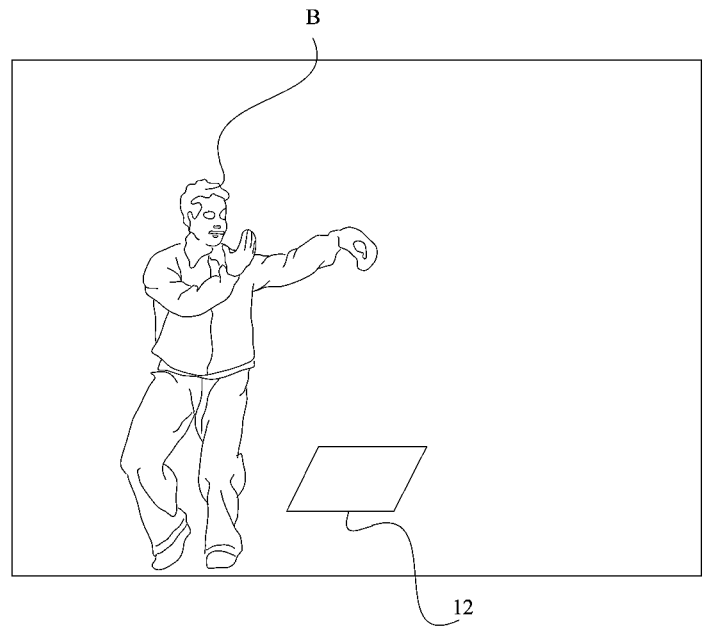
FIG. 9 illustrates a schematic view of still another display effect in accordance with an embodiment of the present disclosure.
Figure 10:
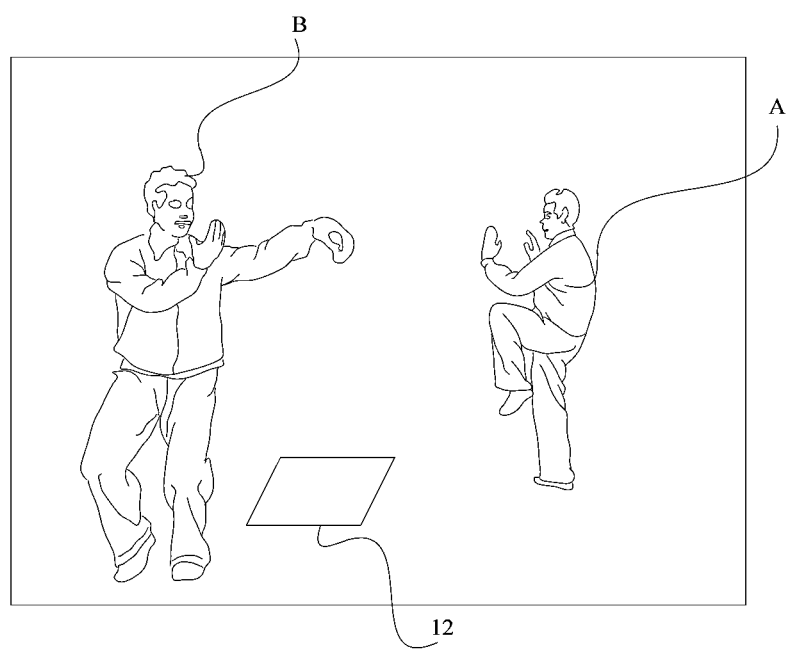
FIG. 10 illustrates a schematic view of still another display effect in accordance with an embodiment of the present disclosure.

For example, please refer to FIGS. 9 and 10 at the same time. After displaying the virtual game character B, the second device receives the display data and the posture data of the virtual game character A generated and displayed by the first device, generates the virtual game character A, displays the virtual game character A, and realizes the synchronization of the virtual game character A added by the first device to the second device for display. In addition, the virtual game character B can be controlled to interact with the virtual game character A in fighting and other actions, so as to realize the interaction of fighting games.

In the scene of the above fighting game, it can be seen that virtual objects (such as the above virtual characters) can be superimposed to positions outside the area where the first target object and the second target object are located in the real scene, so that the user can see the display effect of virtual objects superimposed outside the area where the first target object and the second target object are located.

In some scenes, the virtual object can also be superimposed on location areas of the first target object and the second target object. When the virtual object is displayed through the display screen of the mobile terminal, the content displayed on the display screen can be an image of the virtual object superimposed on the first target object or an image of the virtual object superimposed on the second target object.

For example, in the scene of a chess game, the display screen of the mobile terminal can only display the chessboard, chess pieces and other contents superimposed on the first target object or the second target object, so as to better realize the game display effect. Specifically, both the first device and the second device are mobile terminals. After the first device builds a map based on the first target object, and the second device performs relocalization based on the second target object and the built map, the first device can display the chessboard superimposed on the first target object, and the second device can also synchronously display the chessboard superimposed on the second target object. When the first device adds a "black chess piece" to the chessboard, the first device can send the display data and posture data of the added "black chess piece" to the second device, and the second device displays the "black chess piece" at the same position on the chessboard based on the display data and the posture data. Similarly, when the second device adds a "white chess piece" to the chessboard, the second device can send display data and posture data of the added "white chess piece" to the first device, and the first device displays the "white chess piece" at the same position on the chessboard based on the display data and the posture data of the "white chess piece". In addition, when the first device displays game prompt content, the second device can also synchronously display the game prompt content.

Similarly, the second device can transmit display data and posture data of the target virtual object to the first device, so as to synchronize the virtual object generated and displayed by the second device to the first device for display. It should be noted that since the target virtual object displayed by the second device is generated based on the position in the second spatial coordinate system, the posture data of the target virtual object can be converted into the posture data in the first spatial coordinate system and transmit to the first device based on the coordinate system conversion relationship, so that the first device can generate a target virtual object based on the posture data transmitted from the second device.

Figure 11:
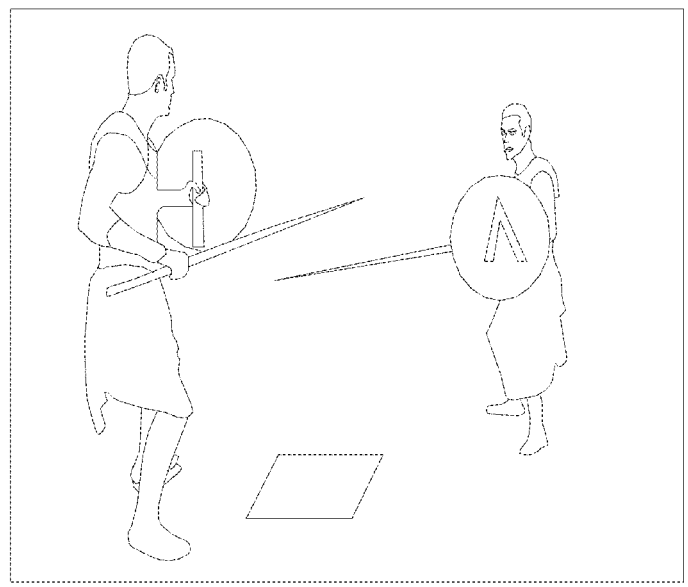
FIG. 11 illustrates a schematic view of still another display effect in accordance with an embodiment of the present disclosure.

In at least one illustrated embodiment, the second device can also detect operation data of added virtual object, respond to the operation data, and synchronize the response result to the first device. For example, after moving the added virtual object, new posture data can be synchronized to the first device. For another example, referring to FIG. 11, in the scene of the fighting game of the above example, virtual characters can be switched to enrich the playing methods of the fighting game.

The data processing method provided by the embodiment of the present disclosure, by acquiring the transmitted data of the map, and the data of the map is obtained through the first device by building, based on the image including the first target object, the map corresponding to the first real scene where the first device is located, the first target object is located in the first real scene, and then acquiring the image including the second target object, the second target object is located in the second real scene where the second device is located, the first target object has a corresponding relationship with the second target object, and then determining the first posture data of the second device in the first spatial coordinate system corresponding to the first device based on the data of the map and the image including the second target object, then obtaining the second posture data of the second device in the second spatial coordinate system corresponding to the second device, and then determining the coordinate system conversion relationship between the first spatial coordinate system and the second spatial coordinate system based on the first posture data and the second posture data, so as to the relocalization is realized. After obtaining the coordinate system transformation relationship, the virtual object can be synchronized based on the coordinate system transformation relationship, so as to realize the synchronous display and interaction in multi-person AR.

Figure 12:
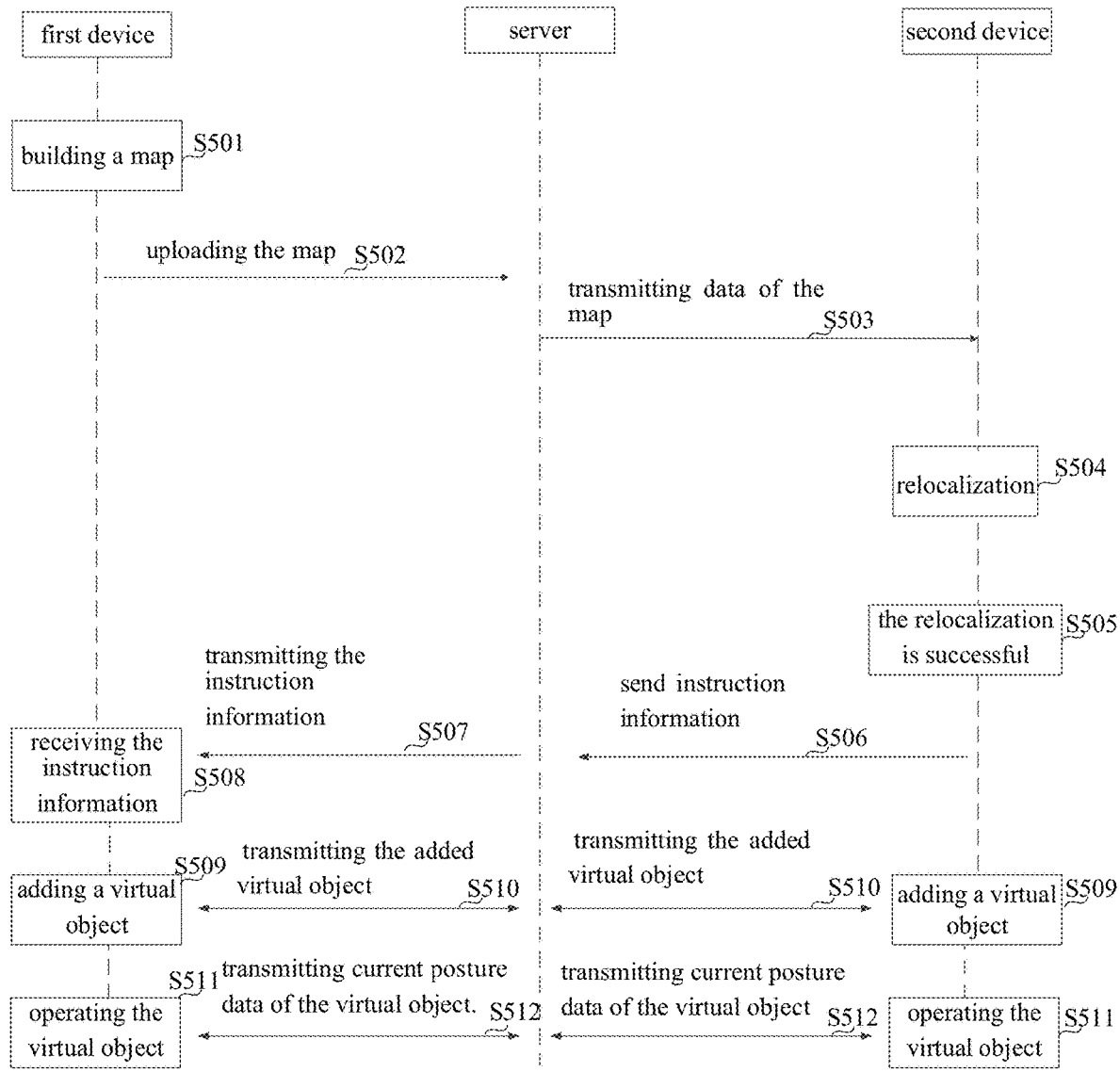
FIG. 12 illustrates a schematic flowchart of a data processing method in accordance with still another embodiment of the present disclosure.

Please refer to FIG. 12, FIG. 12 illustrates a schematic flowchart of a data processing method in accordance with still another embodiment of the present disclosure. The data processing method is implemented by a data processing system, the data processing system includes a first device, a second device and a server, and the first device and the second device are connected with the server in communication. The flow shown in FIG. 12 will be described in detail below. The data processing method may begin from block S501 to block S512.

At the block S501: building a map.

In the embodiment of the present disclosure, the method of the first device building the map can refer to the content of the above embodiments, which will not be repeated here.

At the block S502: uploading the map to the server.

In the embodiment of the present disclosure, the first device can upload the map to the server after building the map.

At the block S503: transmitting data of the map to the second device.

In the embodiment of the present disclosure, after receiving the map uploaded by the first device, the server can transmit the data of the map to the second device.

At the block S504: relocalization.

In the embodiment of the present disclosure, the second device can perform relocalization based on the data of the map and an image including a second target object. For the specific relocalization method, please refer to the content of the above embodiments and will not be repeated here.

At the block S505: the relocalization is successful.

At the block S506: send instruction information to the server.

In the embodiment of the present disclosure, the instruction information is configured to indicate the relocalization on the second device being successful.

At the block S507: transmitting the instruction information to the first device.

In the embodiment of the present disclosure, after receiving the instruction information, the server can transmit the instruction information to the first device, so that the first device can know the relocalization on the second device being successful.

At the block S508: receiving the instruction information.

Accordingly, the first device can receive the instruction information.

At the block S509: adding a virtual object.

In the embodiment of the present disclosure, after the relocalization on the second device is successful and the first device knows that the relocalization on the second device is successful, the first device and the second device can add virtual objects to the virtual scenes respectively.

At the block S510: transmitting the added virtual object.

In the embodiment of the present disclosure, after adding the virtual object, the first device can transmit display data and posture data of the virtual object to the server, and the server can forward the display data and the posture data of the virtual object added by the first device to the second device, so that the second device can synchronously display the virtual object added by the first device. Similarly, after adding a virtual object, the second device can transmit display data and posture data of the added virtual object to the server, and the server can forward the display data and the posture data of the virtual object added by the second device to the first device, so that the first device can synchronously display the virtual object added by the second device. Thus, after the added virtual objects are displayed synchronously with each other, the synchronous display of the virtual objects can be realized, and the subsequent interaction can be carried out based on the displayed virtual objects.

At the block S511: operating the virtual object.

In the embodiment of the present disclosure, the first device can operate the virtual object corresponding to the first device based on the operation of the user. Similarly, the second device can operate the virtual object corresponding to the second device based on the user's operation.

At the block S512: transmitting current posture data of the virtual object.

In the embodiment of the present disclosure, the operation of the virtual object may lead to the change of the pose of the virtual object. Therefore, the current posture data of the virtual object can be transmitted to synchronize the pose change of the virtual object.

Figure 13:
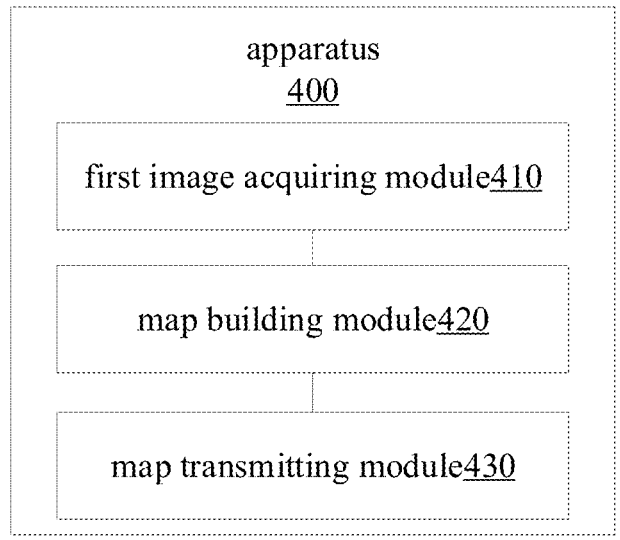
FIG. 13 illustrates a schematic flowchart of functional blocks of a data processing apparatus in accordance with an embodiment of the present disclosure.

Please refer to FIG. 13, FIG. 13 illustrates a schematic flowchart of functional blocks of a data processing apparatus 400 in accordance with an embodiment of the present disclosure. The data processing apparatus 400 is implemented by the first device in the data processing system, the data processing system further includes the second device. The data processing apparatus 400 includes: a first image acquiring module 410, a map building module 420 and a map transmitting module 430. The first image acquiring module 410 is configured to acquire an image including a first target object. The first target object is located in a first real scene where the first device is located. The map building module 420 is configured to build, based on the image, a map corresponding to the first real scene, and obtaining data of the map. The map transmitting module 430 is configured to transmit the data of the map to the second device. The data of the map is configured to instruct the second device to perform relocalization based on the data of the map and a second target object. The first target object and the second target object have at least two identical feature points, the second target object is located in a second real scene where the second device is located, and the second real scene is different from the first real scene.

In at least one illustrated embodiment, the data processing apparatus 400 may further include: a content superposing module and a content displaying module. The content superposing module is configured to control the first device to superimpose a virtual object in the first real scene in response to obtaining instruction information transmitted from the second device and after transmitting the map to the second device. The instruction information is configured to indicate the relocalization on the second device being successful. The content displaying module is configured to display the virtual object.

In this embodiment, the content superimposing module can be specifically configured to: obtain a scene image of the first real scene; obtain a superposition position where the virtual object is to be superimposed on the first real scene; determine, based on the superposition position, pixel coordinates of the virtual object; composite, based on the pixel coordinates, the virtual object with the scene image to obtain a composite image. The content displaying module can be specifically configured to display the composite image.

In this embodiment, the content superposing module can be specifically configured to: obtain a superposition position where the virtual object is to be superimposed on the first real scene; and generate the virtual object based on the superposition position and content data of the virtual object.

The content superposing module obtains the superposition position where the virtual object is to be superimposed on the first real scene, can include: obtaining the superposition position where the virtual object is to be superimposed on the first real scene, in response to detecting an add operation.

In at least one illustrated embodiment, the data processing apparatus 400 may further include: a data acquiring module and a data transmitting module. The data acquiring module is configured to acquire posture data and display data of the virtual object after the virtual object is generated and displayed. The data transmitting module is configured to transmit the display data and the posture data to the second device. The second device is configured to synchronously display, based on the display data and the pose data, the virtual object.

In at least one illustrated embodiment, the map building module 420 may include: a pattern identifying unit, a data acquiring unit and a map generating unit. The pattern identifying unit is configured to identify a pattern of the image to obtain feature information of the pattern, the feature information corresponds to the first real scene. The data acquiring unit is configured to acquire posture data of the first device. The map generating unit is configured to generate, based on the feature information and the posture data, the map corresponding to the first real scene, and obtaining the data of the map.

In at least one illustrated embodiment, the map transmitting module 430 can be specifically configured to transmit the data of the map to a server, and the server is configured to transmit the data of the map to the second device.

Figure 14:
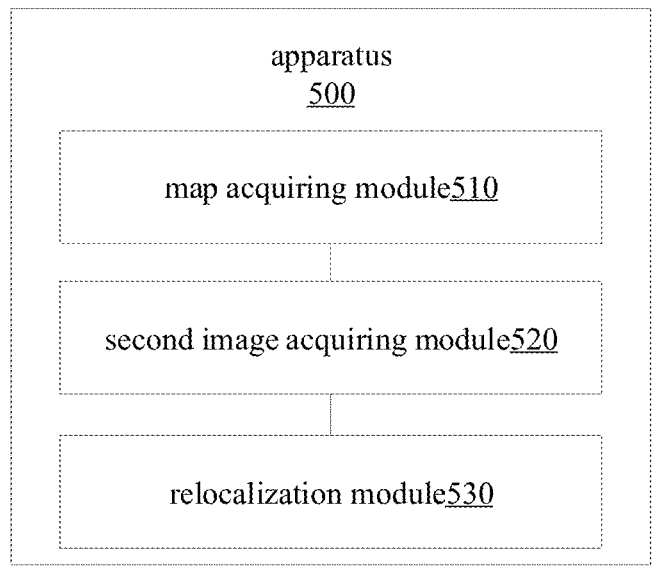
FIG. 14 illustrates a schematic flowchart of functional blocks of a data processing apparatus in accordance with another embodiment of the present disclosure.

Please refer to FIG. 14, FIG. 14 illustrates a schematic flowchart of functional blocks of a data processing apparatus 500 in accordance with another embodiment of the present disclosure. The data processing apparatus 500 is implemented by the second device in the data processing system, and the data processing system further includes the first device. The data processing apparatus 500 includes a map acquiring module 510, a second image acquiring module 520, and a relocalization module 530. The map acquiring module 510 is configured to acquire data of a map transmitted from a first device. The data of the map is obtained through the first device by building, based on an acquired image including a first target object, the map corresponding to a first real scene where the first device is located, and the first target object is located in the first real scene. The second image acquiring module 520 is configured to acquire an image including a second target object. The second target object is located in a second real scene where the second device is located, the first target object and the second target object have at least two identical feature points, and the second real scene is different from the first real scene. The relocalization module 530 is configured to perform relocalization based on the data of the map and the image including the second target object.

In at least one illustrated embodiment, the relocalization module 530 may include: a first pose determining unit, a second pose determining unit and a relationship determining unit. The first pose determining unit is configured to determine, based on the image including the second target object and the data of the map, first posture data of the second device in a first spatial coordinate system, and the first spatial coordinate system is a spatial coordinate system corresponding to the first device. The second pose determining unit is configured to obtain second posture data of the second device in a second spatial coordinate system, the second spatial coordinate system is a spatial coordinate system corresponding to the second device. The relationship determining unit is configured to obtain, based on the first posture data and the second posture data, a coordinate system conversion relationship between the first spatial coordinate system and the second spatial coordinate system.

In at least one illustrated embodiment, the data processing apparatus 500 may further include: a posture data acquiring module, a posture data converting module and a virtual object superposing module. The posture data acquiring module is configured to acquire display data and third posture data of a virtual object displayed by the first device. The posture data converting module is configured to convert, based on the coordinate system conversion relationship, the third posture data into fourth posture data in the second spatial coordinate system. The virtual object superposing module is configured to superimpose, based on the display data and the fourth posture data, the virtual object in the second real scene.

In at least one illustrated embodiment, the data processing apparatus 500 may further include an instruction information generating module. The instruction information generating module is configured to generate instruction information after the relocalization based on the data of the map and the image, and transmit the instruction information to the first device. The instruction information is configured to indicate the relocalization on the second device being successful.

Those of ordinary skill in the art can clearly understand that for the convenience and simplicity of description, the specific working process of the above-described device and module can refer to the corresponding process in the above method embodiment, which will not be repeated here.

In several embodiments provided in the present disclosure, the coupling between modules can be electrical, mechanical or other forms of coupling.

In addition, each functional module in each embodiment of the present disclosure can be integrated into one processing module, each module can exist separately, or two or more modules can be integrated into one module. The above integrated modules can be realized in the form of hardware or software function modules.

An embodiment of the present disclosure further provides a data processing system, which may include a first device and a second device. The first device and the second device can transmit data. Specifically, the first device is configured to: acquire an image including a first target object, the first target object is located in a first real scene where the first device is located; build, based on the image, a map corresponding to the first real scene, and obtaining data of the map; transmit the data of the map to a second device, the data of the map is configured to instruct the second device to perform relocalization based on the data of the map and a second target object; the first target object and the second target object have a corresponding relationship, the second target object is located in a second real scene where the second device is located. The second device is configured to: acquire the data of the map transmitted from the first device, the data of the map is obtained through the first device by building, based on the acquired image including the first target object, the map corresponding to the first real scene where the first device is located, and the first target object is located in the first real scene; acquire an image including a second target object, the second target object is located in a second real scene where the second device is located, the first target object and the second target object have the corresponding relationship; and perform relocalization based on the data of the map and the image including the second target object.

To sum up, the solutions provided in the present disclosure is to obtain the image including the first target object, which is in the first real scene where the first device is located, build, based on the image, the map corresponding to the first real scene, obtain the date of the map, and then transmit the data of the map to the second device, the map data is configured to instruct the second device to perform relocalization based on the data of the map and the second target object, and the first target object and the second target object have at least two same feature points, the second target object is located in the second real scene where the second device is located, and the second real scene is different from the first real scene. Thus, relocalization can be realized based on the objects with corresponding relationships in different real scenes, which is convenient for the realization of multi-person AR solution in AR and improves the user experience.

Figure 15:
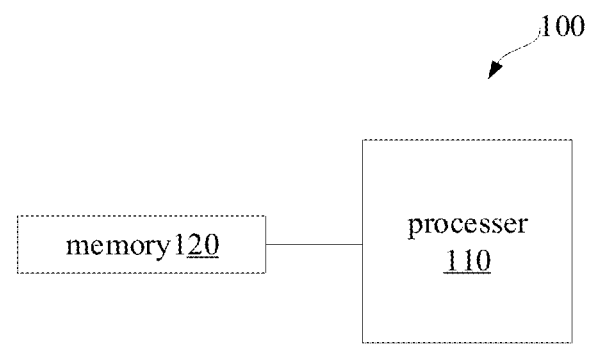
FIG. 15 illustrates a schematic view of functional blocks of an electronic device configured to implement the data processing method in accordance with the embodiments of the present disclosure.

Please refer to FIG. 15, FIG. 15 illustrates a schematic view of functional blocks of an electronic device, in accordance with an embodiment of the present disclosure. The electronic device 100 may be an electronic device capable of running an application, such as a smart phone, a tablet personal computer, a smart watch, a head mounted display device, etc. The electronic device 100 in the present disclosure may include one or more of the following components: a processor 110, a memory 120, and one or more application programs, the one or more application programs may be stored in the memory 120 and configured to be executable by the one or more processors 110, and the one or more application programs are configured to execute the method described in the foregoing method embodiments.

The processor 110 may include one or more processing cores. The processor 110 uses various interfaces and lines to connect to various parts of the entire electronic device 100, and executes various functions of the electronic device 100 and processes data by running or executing instructions, programs, code sets or instruction sets stored in the memory 120 and retrieving data stored in the memory 120. In at least one illustrated embodiment, the processor 110 may be implemented by at least one hardware form of a Digital Signal Processing (DSP), a Field-Programmable Gate Array (FPGA) and a Programmable Logic Array (PLA). The processor 110 may be integrated with one or any combination of a Central Processing Unit (CPU), a Graphics processing Unit (GPU) and a modem. The CPU mainly processes an operating system, a user interface, applications and so on. The GPU is configured to render and draw a content that needs to be displayed on a display. The modem is configured to process wireless communication. It can be understood that the above modem may not be integrated into the processor 110, but may be implemented by a chip alone.

The memory 120 may include a Random-Access Memory (RAM) or may include a Read-Only Memory. The memory 120 may be configured to store instructions, programs, codes, code sets, or instruction sets. The memory 120 may include a program storage region and a data storage region. The program storage region may store instructions for implementing the operating system, instructions for at least one function (such as a touch function, a sound playback function, an image playback function, etc.), instructions used to implement the following method embodiments, etc. The data storage region can store data (such as phonebook, audio and video data, chat record data) created by the electronic device 100 in use.

Figure 16:
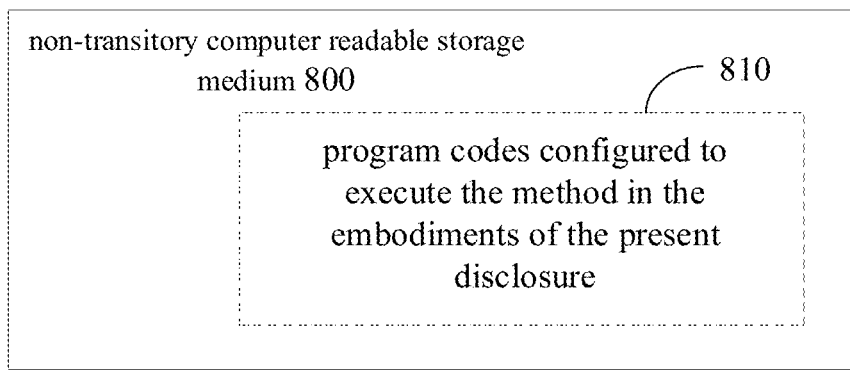
FIG. 16 illustrates a schematic view of a functional block of a non-transitory computer readable storage medium configured to store or carry program codes to implement the data processing method in accordance with the embodiments of the present disclosure.

Please refer to FIG. 16, FIG. 16 illustrates a schematic view of functional blocks of a non-transitory computer readable storage medium, in accordance with an embodiment of the present disclosure. The non-transitory computer readable storage medium 800 stores program codes that can be callable by a processor to execute the method described in the above method embodiment.

The non-transitory computer readable storage medium 800 may be an electronic memory such as a flash memory, an Electrically Erasable Programmable Read Only Memory (EEPROM), an Erasable Programmable Read Only Memory (EPROM), a hard disk, or a Read Only Memory (ROM). In at least one illustrated embodiment, the non-transitory computer readable storage medium 800 includes a non-transitory computer readable storage medium. The non-transitory computer readable storage medium 800 has a storage space for the program codes 810 configured to implement any method steps described in the above embodiments. These program codes can be read from or written into one or more computer program products. The program codes 810 may be compressed, for example, in an appropriate form.

Finally, it should be noted that the above embodiments are only used to illustrate the technical solutions of the present disclosure, but not intended to limit the present disclosure. Although the present disclosure has been described in detail with reference to the foregoing embodiments, it should understand that those of original skill in the art can still modify the technical solutions recorded in the foregoing embodiments or equivalently replace some of the technical features. These modifications or replacements do not make the essence of the corresponding technical solutions deviate from the spirit and scope of the technical solutions of the embodiments of the present disclosure.

What is claimed is:

1. A data processing method, implemented by a first device, the data processing method comprising:
    acquiring an image comprising a first target object, wherein the first target object is located in a first real scene where the first device is located;
    building, based on the image, a map corresponding to the first real scene, and obtaining data of the map; and
    transmitting the data of the map to a second device, wherein the data of the map is configured to instruct the second device to perform relocalization based on the data of the map and a second target object, the first target object and the second target object have at least two identical feature points, the second target object is located in a second real scene where the second device is located, and the second real scene is different from the first real scene;
    wherein the first target object comprises a pattern generated in advance based on the first real scene; and the building, based on the image, a map corresponding to the first real scene, and obtaining data of the map, comprises:
        identifying the pattern in the image to obtain feature information of the pattern, wherein the feature information corresponds to the first real scene;
        acquiring posture data of the first device; and
        generating, based on the feature information and the posture data of the first device, the map corresponding to the first real scene, and obtaining the data of the map.

2. The data processing method according to claim 1, wherein after the transmitting the data of the map to a second device, the data processing method further comprises:
    superimposing a virtual object in the first real scene in response to obtaining instruction information transmitted from the second device, wherein the instruction information is configured to indicate relocalization on the second device being successful; and
    displaying the virtual object.

3. The data processing method according to claim 2, wherein the superimposing a virtual object in the first real scene comprises:
    obtaining a scene image of the first real scene;
    obtaining a superposition position where the virtual object is to be superimposed on the first real scene;
    determining pixel coordinates of the virtual object based on the superposition position; and
    composing, based on the pixel coordinates, the virtual object with the scene image to obtain a composite image; and wherein the displaying the virtual object comprises:
displaying the composite image.

4. The data processing method according to claim 3, wherein the obtaining a superposition position where the virtual object is to be superimposed on the first real scene, comprises:
obtaining the superposition position where the virtual object is to be superimposed on the first real scene, in response to detecting an add operation.

5. The data processing method according to claim 4, wherein the detecting an add operation comprises:
obtaining a captured gesture image;
performing gesture recognition based on the gesture image; and
determining the add operation is detected in response to a recognized gesture is a setting gesture.

6. The data processing method according to claim 2, wherein the superimposing a virtual object in the first real scene comprises:
obtaining a superposition position where the virtual object is to be superimposed on the first real scene; and
generating the virtual object based on the superposition position and content data of the virtual object.

7. The data processing method according to claim 6, wherein the obtaining a superposition position where the virtual object is to be superimposed on the first real scene, comprises:
obtaining the superposition position where the virtual object is to be superimposed on the first real scene, in response to detecting an add operation;
wherein the detecting an add operation comprises:
obtaining a captured gesture image;
performing gesture recognition based on the gesture image; and
determining the add operation is detected in response to a recognized gesture is a setting gesture.

8. The data processing method according to claim 2, wherein after generating and displaying the virtual object, the data processing method further comprises:
acquiring posture data and display data of the virtual object; and
transmitting the display data and the posture data of the virtual object to the second device, wherein the second device is configured to synchronously display the virtual object based on the display data and the posture data of the virtual object.

9. The data processing method according to claim 1, wherein the posture data of the first device comprises a position and a posture of the first device in a spatial coordinate system corresponding to the first device; and
wherein the generating, based on the feature information and the posture data of the first device, the map corresponding to the first real scene, and obtaining the data of the map comprises:
determining, based on the feature information, a content of the map corresponding to the first real scene;
determining, based on the position and the posture, a position of the content of the map in the spatial coordinate system corresponding to the first device; and
building, based on the content of the map and the position of the content of the map, the map corresponding to the first real scene, and obtaining the data of the map.

10. The data processing method according to claim 1, wherein the building, based on the image, a map corresponding to the first real scene, and obtaining data of the map, comprises:

building a plurality of maps according to the feature information and the posture data of the first device; and
selecting, from the plurality of maps, a map satisfying a specified condition as the map corresponding to the first real scene and obtaining the data of the selected map.

11. The data processing method according to claim 10, wherein the specified condition comprises:
a matching degree between a content of the selected map and the first real scene is higher than a setting threshold.

12. The data processing method according to claim 1, wherein the transmitting the data of the map to a second device comprises:
transmitting the data of the map to a server, wherein the server is configured to transmit the data of the map to the second device.

13. The data processing method according to claim 1, wherein the feature points are configured to be identified contents of the map by the first device and the second device, and the contents of the map correspond to the feature points.

14. A data processing method, implemented by a second device, the data processing method comprising:
acquiring data of a map transmitted from a first device, wherein the data of the map is obtained through the first device by building, based on an acquired image comprising a first target object, the map corresponds to a first real scene where the first device is located, and the first target object is located in the first real scene;
acquiring an image comprising a second target object, wherein the second target object is located in a second real scene where the second device is located, the first target object and the second target object have at least two identical feature points, and the second real scene is different from the first real scene; and
performing relocalization based on the data of the map and the image comprising the second target object, comprising:
determining, based on the image comprising the second target object and the data of the map, first posture data of the second device in a first spatial coordinate system, wherein the first spatial coordinate system is a spatial coordinate system corresponding to the first device;
obtaining second posture data of the second device in a second spatial coordinate system, wherein the second spatial coordinate system is a spatial coordinate system corresponding to the second device; and
obtaining, based on the first posture data and the second posture data, a coordinate system conversion relationship between the first spatial coordinate system and the second spatial coordinate system.

15. The data processing method according to claim 14, wherein the data processing method further comprises:
acquiring display data and third posture data of a virtual object displayed by the first device;
converting, based on the coordinate system conversion relationship, the third posture data into fourth posture data in the second spatial coordinate system; and
superimposing, based on the display data and the fourth posture data, the virtual object in the second real scene.

16. The data processing method according to claim 14, wherein after the performing relocalization based on the data of the map and the image comprising the second target object, the data processing method further comprises:
generating instruction information and transmitting the instruction information to the first device, wherein the instruction information is configured to indicate the relocalization on the second device being successful.

17. The data processing method according to claim 14, wherein the feature points are configured to be identified contents of the map by the first device and the second device, and the contents of the map correspond to the feature points.

18. An electronic device, comprising:
one or more processors;
a memory; and
one or more application programs;
wherein the one or more application programs are stored in the memory and configured to be executable by the one or more processors, and the one or more application programs are configured to execute one of a first data processing method and a second data processing method;
wherein the first data processing method comprises:
acquiring an image comprising a first target object, wherein the first target object is located in a first real scene where a first device is located;
building, based on the image, a map corresponding to the first real scene, and obtaining data of the map; and
transmitting the data of the map to a second device, wherein the data of the map is configured to instruct the second device to perform relocalization based on the data of the map and a second target object, the first target object and the second target object have at least two identical feature points, the second target object is located in a second real scene where the second device is located, and the second real scene is different from the first real scene;
wherein the first target object comprises a pattern generated in advance based on the first real scene; and the building, based on the image, a map corresponding to the first real scene, and obtaining data of the map, comprises:
identifying the pattern in the image to obtain feature information of the pattern, wherein the feature information corresponds to the first real scene;
acquiring posture data of the first device; and
generating, based on the feature information and the posture data of the first device, the map corresponding to the first real scene, and obtaining the data of the map; and
wherein the second data processing method comprises:
acquiring the data of the map transmitted from the first device, wherein the data of the map is obtained through the first device by building, based on the acquired image comprising the first target object, the map corresponding to the first real scene where the first device is located, and the first target object is located in the first real scene;
acquiring an image comprising a second target object, wherein the second target object is located in a second real scene where a second device is located, the first target object and the second target object have at least two identical feature points, and the second real scene is different from the first real scene; and
performing relocalization based on the data of the map and the image comprising the second target object.

19. The electronic device according to claim 18, wherein the performing relocalization based on the data of the map and the image comprising the second target object, comprising:
determining, based on the image comprising the second target object and the data of the map, first posture data of the second device in a first spatial coordinate system, wherein the first spatial coordinate system is a spatial coordinate system corresponding to the first device;
obtaining second posture data of the second device in a second spatial coordinate system, wherein the second spatial coordinate system is a spatial coordinate system corresponding to the second device; and
obtaining, based on the first posture data and the second posture data, a coordinate system conversion relationship between the first spatial coordinate system and the second spatial coordinate system.

20. The electronic device according to claim 18, wherein after the transmitting the data of the map to a second device, the first data processing method further comprises:
superimposing a virtual object in the first real scene in response to obtaining instruction information transmitted from the second device, wherein the instruction information is configured to indicate relocalization on the second device being successful; and
displaying the virtual object;
wherein the superimposing a virtual object in the first real scene comprises:
obtaining a superposition position where the virtual object is to be superimposed on the first real scene, in response to detecting an add operation; and
generating the virtual object based on the superposition position and content data of the virtual object; and
wherein the detecting an add operation comprises:
obtaining a captured gesture image;
performing gesture recognition based on the gesture image; and
determining the add operation is detected in response to a recognized gesture is a setting gesture.

* * * * *